US007519578B2

(12) United States Patent
Mihai et al.

(10) Patent No.: US 7,519,578 B2
(45) Date of Patent: Apr. 14, 2009

(54) UBIQUITOUS SEARCH FRAMEWORK

(75) Inventors: Constantin Mihai, Bellevue, WA (US); David Rothenberg, Fall City, WA (US); Ray Patch, Redmond, WA (US); Gabriel Gottlieb, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 10/678,714

(22) Filed: Oct. 3, 2003

(65) Prior Publication Data

US 2005/0076016 A1 Apr. 7, 2005

(51) Int. Cl.
*G06F 17/30* (2006.01)

(52) U.S. Cl. ...................... 707/3; 707/4; 707/5; 707/10

(58) Field of Classification Search ................ 707/1–10
See application file for complete search history.

(56) References Cited

U.S. PATENT DOCUMENTS 6,178,418 B1 * 1/2001 Singer ........................... 707/3
6,457,009 B1 * 9/2002 Bollay ......................... 707/10
6,826,553 B1 * 11/2004 DaCosta et al. ................ 707/1
6,910,003 B1 * 6/2005 Arnold et al. .................. 704/4
7,171,415 B2 * 1/2007 Kan et al. ..................... 707/10

OTHER PUBLICATIONS

ObjectGlobe: Ubiquitous query processing on the internet, by R. Braumandl et al. Springer-Verlag 2001.*

Universal Data Access With OLE DB, By Jose A Blakeley et al, 1997 IEEE.*

Microsoft Univeral Data Access Platform, By Jose A. Blakeley et al, 1998 ACM.*

A Universal Query Interface for Heterogenous Distributed Digital Libraries, by Norio Katayama et al 1996 IEEE.*

Huang, L. et al., "Adaptively Constructing the Query Interface for Meta-Search Engines", *International Conference on Intelligent User Interfaces, Proceedings of the 6th International Conference on Intelligent User Interfaces*, 2001, 97-100.

Khoussainov, R. et al., "Automated Index Management for Distributed Web Search", *Conference on Information and Knowledge Management, Proceedings of the twelfth (12th) International Conference on Information and Knowledge Management*, 2003, 386-393.

* cited by examiner

*Primary Examiner*—Khanh B Pham
(74) *Attorney, Agent, or Firm*—Woodcock Washburn LLP

(57) ABSTRACT

A mechanism is provided to a user which allows "ubiquitous" searching—searching of possibly heterogeneous search repositories. In one embodiment, this search mechanism is provided by means of a search framework underlying a web-based user interface. When a search request is made, the underlying search framework detects the search request and its associated parameters, associates the search request with the required search provider or providers while still exposing (through the search context) the full search functionality for all search providers currently configured with the search framework, dispatches the search requests, and handles the return of search results in a unified format. The search providers follow the search framework's interfaces through which the search framework can detect the search method offered by the search provider, and results format and option information.

10 Claims, 5 Drawing Sheets

UBIQUITOUS SEARCH FRAMEWORK

FIELD OF THE INVENTION

This invention relates in general to the field of data search and retrieval. More particularly, this invention relates to the provision of a search framework for searching data repositories.

BACKGROUND OF THE INVENTION

A data repository stored on a computer system may contain data useful for a user. However, the data repository may be too large for the user to find the data by examining the entire data repository. Additionally, some parts of the data repository may contain information that for security or privacy reasons should not be made accessible to the user, even if other parts can be made accessible to the user. In many cases, in order to allow the user useful access to the data in the data repository, a search mechanism is provided. The search mechanism allows a user to issue a search request (also termed a search query). One or more results (if any are found) are then returned for the user. These results may include the entire data item which the user has requested. Results may also be summary results, which include only summary information which can be used to obtain the entire data item.

For example, a search for a specific author in a bookseller's data repository may yield a number of results, each with the entire data item for each book by that specific author, including, for example, title, item number, condition, price, publication date, publisher, number of pages, etc. Alternatively, where results are only summary results, each result may include only title, an item number, the condition of the book, and the price of the book. Where summary results are provided, often a way to access the complete data item (or a more complete version of the data item) is included as part of a summary result. For example, where a search is performed using a web browser, a hypertext link to the data item may be provided as part of the summary result.

A user may wish to search a number of different search repositories at the same time. However, performing such a search on a number of different search repositories at the same time presents difficulties. Different search repositories may have different search mechanisms, and a single query may not be valid for each search repository being searched. These differences create a situation in which a user must remember how to request data from each data repository.

Additionally, the results from different search repositories may be returned in different formats, and/or with different information included in each results. For example, a search for a specific author may be performed for a book on a bookseller's data repository. A search for the same author may be performed on a library system's data repository. The query may need to be sent in two different ways for these two different data repositories. Additionally, the results received may contain different information. The search results from the bookseller may include, for each result, in this order:

- the title of the book,
- an item number,
- the condition of the book, and
- the price of the book.

The results from the library system may include, in this order:

- the call number of the book,
- the title of the book,
- the author of the book,
- the publisher of the book,

- the copyright date of the book, and
- information regarding whether the book is currently available at the library.

Where a user wishes to collect all of the results from different data repositories, the disparity in both the information retrieved and the order of retrieval would make it confusing for a user to view all sets of results in one list.

Thus, there is a need for a way to provide a user with access to more than one data repository, simplifying the issuance of a request for data to more than one data repository and presenting data in a manner which is more immediately understandable to the user.

SUMMARY OF THE INVENTION

The invention provides a mechanism by which a ubiquitous search may be provided to a user. A ubiquitous search allows a user to search any number of repositories or search engines from a group of different repositories/search engines with one generic search request, providing a unified user interface for different repositories. The search results from different search repositories are converted to a more unified format for presentation to the user.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

In accordance with the invention, a mechanism is provided to a user which allows "ubiquitous" searching—searching of possibly heterogeneous search repositories. The heterogeneity of the search repositories arise from utilization of different underlying search engines, request formats and/or different result formats in which results are presented to a user. In one embodiment, this search mechanism is provided by means of a search framework underlying a web-based user interface. When a search request is made, the underlying search framework detects the search request and, in one embodiment, parameters associated with the search request. The search request is associated with the requested search provider (the repository or search engine to be searched) or providers. Full search functionality is exposed for all search providers currently configured with the search framework. The search framework dispatches the search requests, and handles the return of search results in a unified format.

Additionally, the search framework allows extensibility by allowing new search providers to be added to the framework through definition of the interface (acting as a "contract") to be followed in terms of request format and results format for the new search providers.

Exemplary Computing Environment

Figure 1:
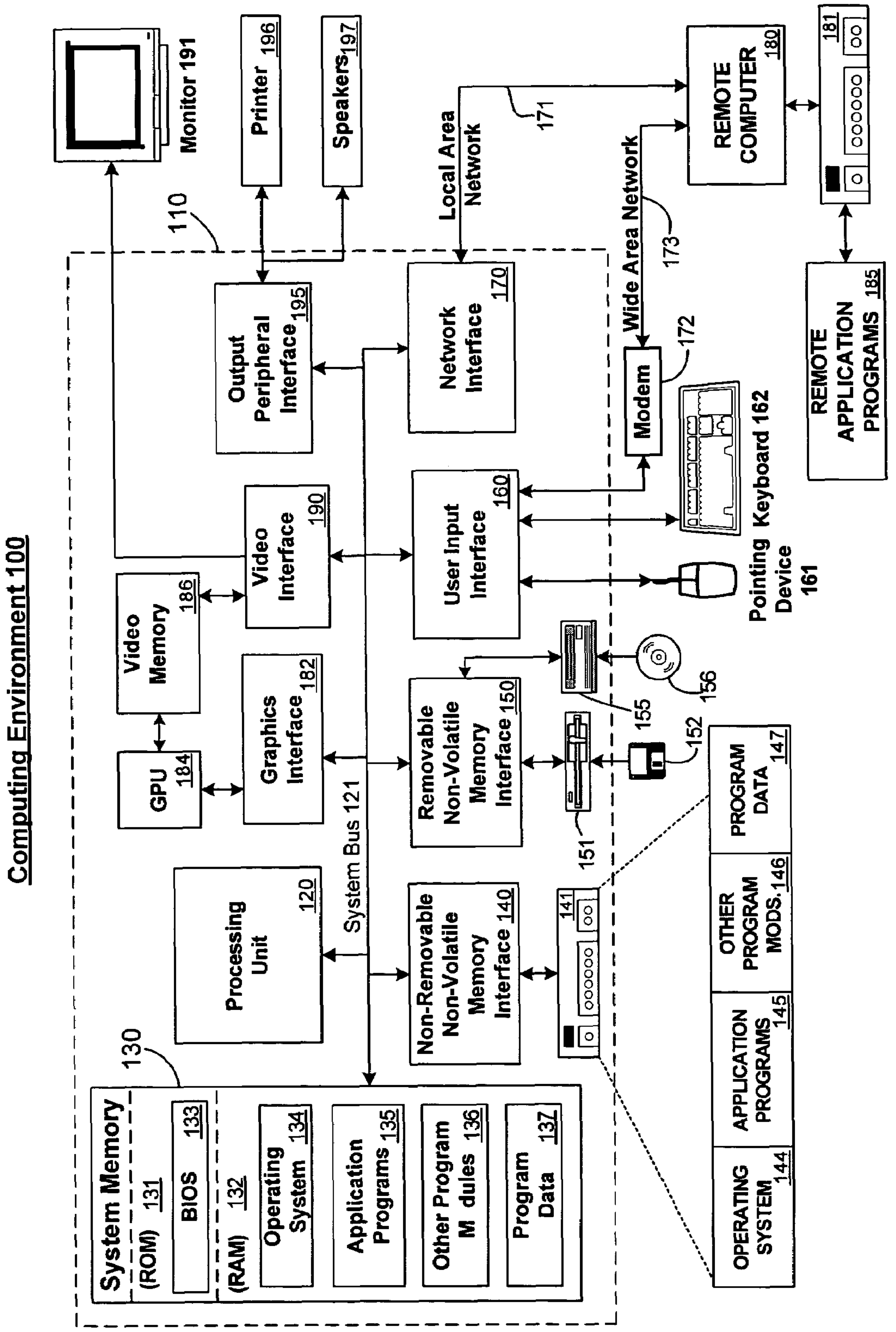
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Search Framework—Interfaces for Providers

Figure 2:
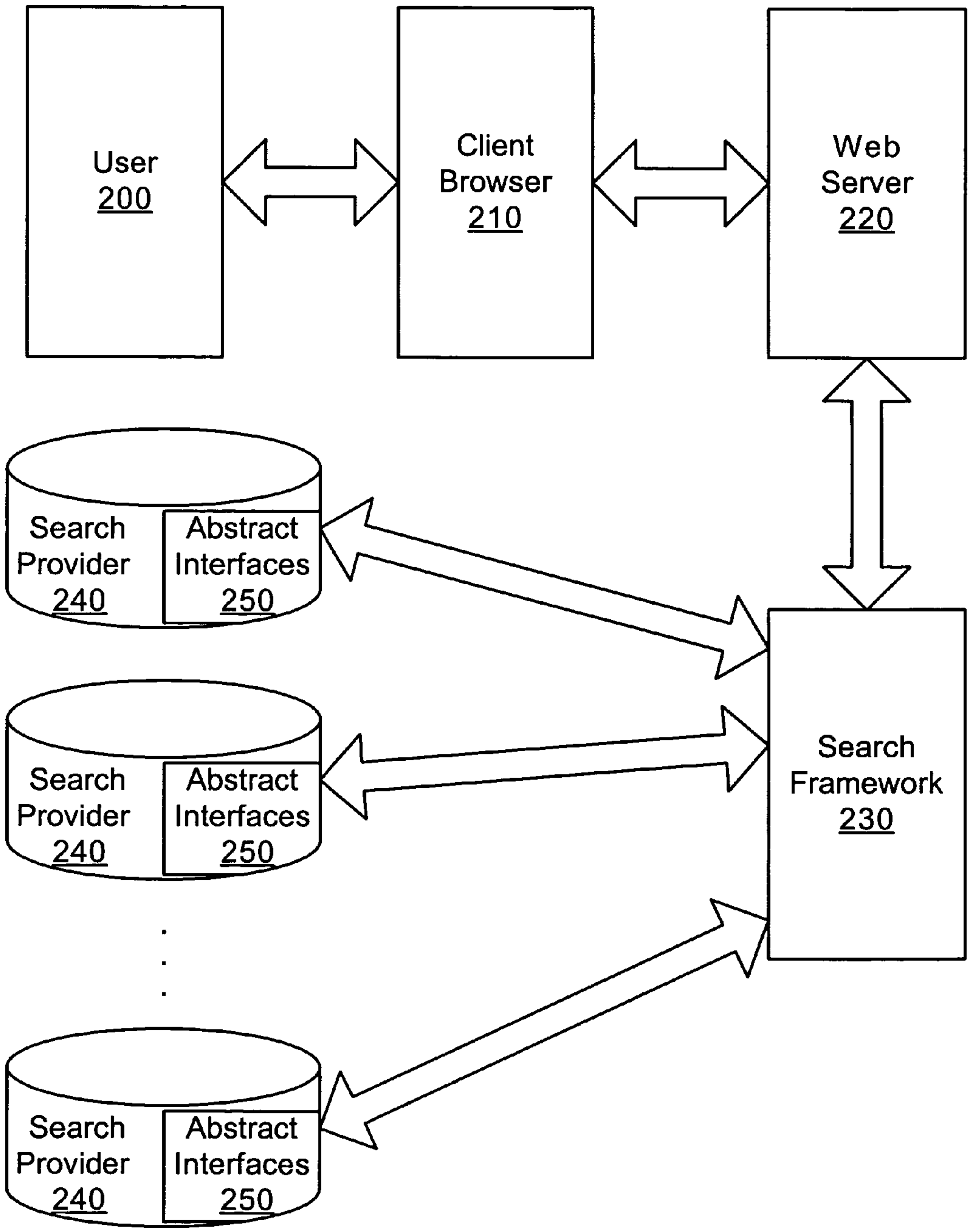
FIG. 2 is a block diagram of the use of a search framework according to one embodiment of the invention.

In one embodiment, the search framework is implemented as a feature for use with a website in which search facilities are being provided. As shown in FIG. 2, a user 200, uses a client browser 210, to interact with a web server 220. This interaction may be direct, via a network such as the Internet, or by other means. The web server 220 receives requests for data from the client browser, and returns information. In one embodiment, the returned information is in hypertext markup language (HTML) which is interpreted by the client browser 210 and displayed for the user 200. The user 200 may require data from multiple search providers 240. In order to provide this data, a search framework 230 is used. As shown in FIG. 2, in one embodiment the search framework 230 is separate from and operably connected to web server 220, however, in another embodiment this search framework 230 is included as part of web server 220.

The search framework 230 includes interface information for searches on each of the available underlying search providers 240. This information, in one embodiment, is embodied in abstract interfaces 250 which define the minimum functionality that a search provider 240 is required to provide in order for that search provider 240 to be included in the ubiquitous search provided by the search framework 230. These interfaces 250, in one embodiment, are the search interface, the results interface, and the options interface.

In order for the search framework 230 to support a search provider 240, the search provider 240 must be registered with the search framework 230. When these interfaces 250 are discovered for a search provider 240, a search using the registered search provider 240 can be provided to the user as part of a ubiquitous search by the search framework 230. These interfaces 250 represent and implement a "contract" between the search framework 230 and the search providers 240, allowing new search providers 240 to be easily integrated into the search capability provided by search framework 230.

The search interface returns a search method which can be used to perform a search on search provider 240. The options interface describes the options which can be used with a search on search provider 240. The results interface describes the results which will be returned from a call to the search. When a search is run on search provider 240 by a method provided in a search context of search framework 230, the search method provided in the search interface is used. The search options are set as described in the search interface. And the results are returned as described in the results interface. These interfaces, according to one embodiment of the current invention, is described below.

Search Interface

The first of these interfaces 250, the search interface, is the interface by which a search provider 240 exposes properties for getting/setting its search options and also exposes a public method which actually triggers the search and retrieval of data.

This interface may be more clearly understood using the following pseudocode:

```
public interface ISearchProvider
{
    ISearchOptions SearchOptions {get; set;}
    ISearchResults Search ( );
}
```

The SearchOptions public properties gets and/or sets the search options, and the Search public method performs the actual, provider-specific search operation for the specific search provider 240 implementing the ISearchProvider interface. The Search method returns an results object. The results object is returned in a format specified by the second abstract interface, the results interface.

Results Interface

The result of a provider-specific search operation will be provided by the search provider 240 as a data object which implements the results interface for the search provider 240 being used. The results interface may be more clearly understood using the following pseudocode:

```
public interface ISearchResults
    {
        int Count { get; }
        int EstimatedMaxCount { get; }
        DataSet ResultSet { get; }
        int StartingIndex { get; }
        object this [int index] { get; }
    }
```

When the results are returned, they are returned with the information specified in the ISearchResults interface. The Count property returns the number of items being returned. The EstimatedMaxCount property returns the estimated number of total results. Thus, if a search provider 240 returns the first 20 items for a given search, and estimates that there are 100 total items which might be retrieved for that search request, Count will equal 20 and EstimatedMaxCount 100. The results will be returned in a form chosen by the search provider 240. Thus, DataSet is the type for the result. The structure of the actual DataSet may vary between the different search providers 240. The results are returned as the ResultSet property, which is of type DataSet. The StartingIndex property returns the index for the first record contained in ResultSet. "this[ ]" defines an indexer for each result asked for, and "this[ ]" can be used to get the result at the specified index.

Options Interface

The basic search attributes generally used across many search providers 240 are configured, for each search request, using the ISearchOptions interface. The options interface may be more clearly understood with reference to the following pseudocode:

```
public interface ISearchOptions
{
    AdvancedSearchType AdvancedSearchOption { get; set;}
    int ContentDescriptionSize { get; set; }
    string FreeTextSearchPhrase { get; set; }
    int MaxResultSize { get; set; }
    string QueryString { get; set; }
    string ServerInformation { get; set; }
    int ServerTimeout { get; set; }
    int StartingIndex { get; set; }
}
public enum AdvancedSearchType
{
        None,
        And,
        Or,
        Exact
}
}
```

The AdvancedSearchOption property gets and/or sets any advanced search options available for the search provider 240. The default value for this is that there are no advanced search options. The values used in the AdvancedSearchOption property are defined in the helper enumeration class AdvancedSearchType. AdvancedSearchType, in the example, includes four types of search options (None, And, Or, and Exact.) This type can be extended to accommodate further advanced options.

The ContentDescriptionSize property holds the size, in bytes, of the description that will be returned for each result in the ResultSet.

The FreeTextSearchPhrase property holds the search phrase or keywords which are being searched for.

The MaxResultSize property sets the maximum size of the result set to be returned.

The QueryString property is provider specific and optional. This is used to get and/or set the query string.

The ServerInformation property holds information necessary to contact the server that receives/processes the search request. For example, it may contain the server's address. Each search provider 240 may be hosted on a separate server, each with a different server address. In the alternative, there may be one or more search provider 240 at a single server.

The ServerTimeout property holds the time to wait, in milliseconds, for a server response before the response is to time out and an error is returned. The default value for this is 60,000 milliseconds.

The StartingIndex property describes what the index for the first result to be returned is in the ResultSet.

Registering of Search Providers

The search providers 240 are configured, in one embodiment, by a developer for the website providing the ubiquitous search framework via a provider configuration information which is stored in a predetermined location. In one embodiment, this is the web.config file, a file which generally stores configuration information for the website and is used for initialization of the web site.

The provider configuration information allows a developer to list all of the providers for which access through the ubiquitous search can be provided. Additionally, configuration parameters can be passed to the providers. When a provider is initialized, these configuration parameters (for example, a default result size or the query ranking which is used with the provider) will be used with the provider.

Providing a Ubiquitous Search

In one embodiment of the present invention, the search framework registers the search providers 240. After search providers 240 have been registered, the search framework 230 monitors requests from client browser 210 to determine, for each request which comes to the web server 220, whether the request is a ubiquitous search request. When a ubiquitous search request arrives, the search framework 230 instantiates a search context for the request. This search context exposes search related properties and methods related to the ubiquitous search request.

These search related properties and methods are the properties and methods necessary to perform search responsive to the search request which has been entered on each of the search providers 240 which are responsive to the request. A uniform set of properties and methods are provided by the search framework through the search context which has been instantiated. In order to use the properties and methods, the web server 220 creates a page which uses the properties and calls the methods of the search context. In this way, the complexities of dealing with the possibly heterogeneous searches provided by search providers 240 are avoided, but instead the web server 220 calls the unified methods which have been provided in the search context by the search framework 230.

For example, if the request which has arrived from the client browser 210 is a search for an exact match for the author "Douglas Adams" on two search providers 240, the search context will expose properties and methods which can be used to call the specified search providers 240 to perform that search. A method for searching for the requested author "Douglas Adams" on the first search provider 240 and the second search provider 240 will also be exposed by the search context of search framework 230.

Also as a result of the request, at least one page will be created by the web server 220 to be sent back to client browser 210. Each page begins as a "code behind" object, which consists of code which creates HTML code. The HTML code is then sent to the client browser 210. A code behind object which is created by web server 220 in response to a ubiquitous search request calls one or more of the search context's methods in order to communicate with the two search providers 240. Because of the standardized interfaces 250 which have been created, responses from the search providers 240 are returned to the web server 220 which can be displayed in a uniform manner.

In the example discussed previously, one search provider, a bookseller, returns a search result for a book as, in this order: title, item number, condition of the book, and the price of the book. Another search provider, a library, returns: call number, title, author, publisher, copyright date, and availability information. Each of these search providers may also have different search formats in which to request a search.

When a search is detected by the search framework 230, a search context is created which provides methods for performing the search on each of the search providers 240 which are currently configured in the search framework. Therefore, the code behind object can request the search on each of the search providers by using the methods provided in the search context. On the other side, the ubiquitous search framework is capable of detecting the implicit search provider associated with the current search and expose it separately from the set of all the other search providers. In this way, instead of having to know provider-specific information regarding how to perform the requested search on each search provider, the developer of the code behind object need only know how to access the standardized methods for performing the searches which are provided by the search framework 230. Thus a developer of a web server 220 need not deal with the heterogeneity of search providers 240. Furthermore, the addition of a new provider with new a search request and/or search result format can be accomplished without any changes to web server 220 or the code behind, or without substantial changes to web server 220 or code behind.

Additionally, in one embodiment, the format for the results is also registered by the provider. Thus, when the provider is being configured, the DataSet type of the ResultSet from the result interface for a given search provider 240 may be more specifically defined. This acts as a template for the results returned for the given search provider. If the location of the title information in the results for each of the two results page has been mapped to a title field in the template, the code behind object can request that the title information be returned by calling the correct method provided by the search context and requesting the field which has the title template. Thus a unified response format may be established for all responses. Alternately, response format data may be included with the search request, and the results from the search context methods will be formatted according to the response format data.

In an alternate embodiment, where, for example, a title is needed for all searches regardless of which search provider 240 are being searched, in addition to the interfaces 250 described above, the interfaces 250 also include a property which requests that particular element. For example, each set of interfaces 250 may be required to have a title property which returns the title for each result of a search.

User Interface and Result List Control

Figure 3:
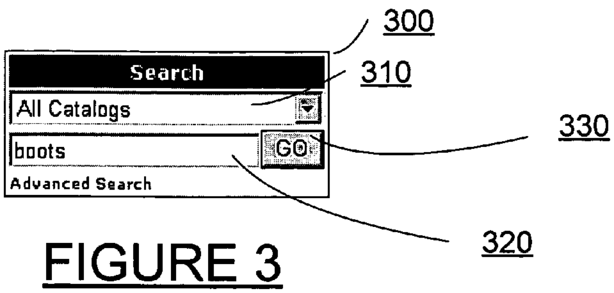
FIG. 3 is a diagram of user interface according to one embodiment of the invention.

In one embodiment, as shown in FIG. 3, a control 300 is built which can be used in web pages presented to the user. The control 300 has two portions: a pull down menu 310 which allows a user to select between search providers 240 or combinations of search providers 240. For example, the selection shown in FIG. 3 shows that the user has selected a search of all available catalogs which is a flavor of catalog search provider. Other options in the pulldown menu might include single catalog search which is a different flavor of the catalog search provider. The control 300 also includes a text box 320 in which a user can enter a search, and a "GO" button 330 used to request the search specified by pull down menu 310 and text box 320.

When a request is submitted via such a control, an event is raised which is detected by the search framework 240, causing it to create the search context which allows calls to the requested search providers to go forward. Other user interfaces are also contemplated which allow alternate interfaces, including interfaces incorporating more complex search interfaces and search provider selection interfaces.

In one embodiment, a server control will be provided in the framework. The server control provides a data-bindable and template-able control which allows the results to be collected and displayed. The ability of the control to be templated allows site designers to display the results with formatting controlled by the site designers.

Methods According to Various Embodiments

Figure 4:
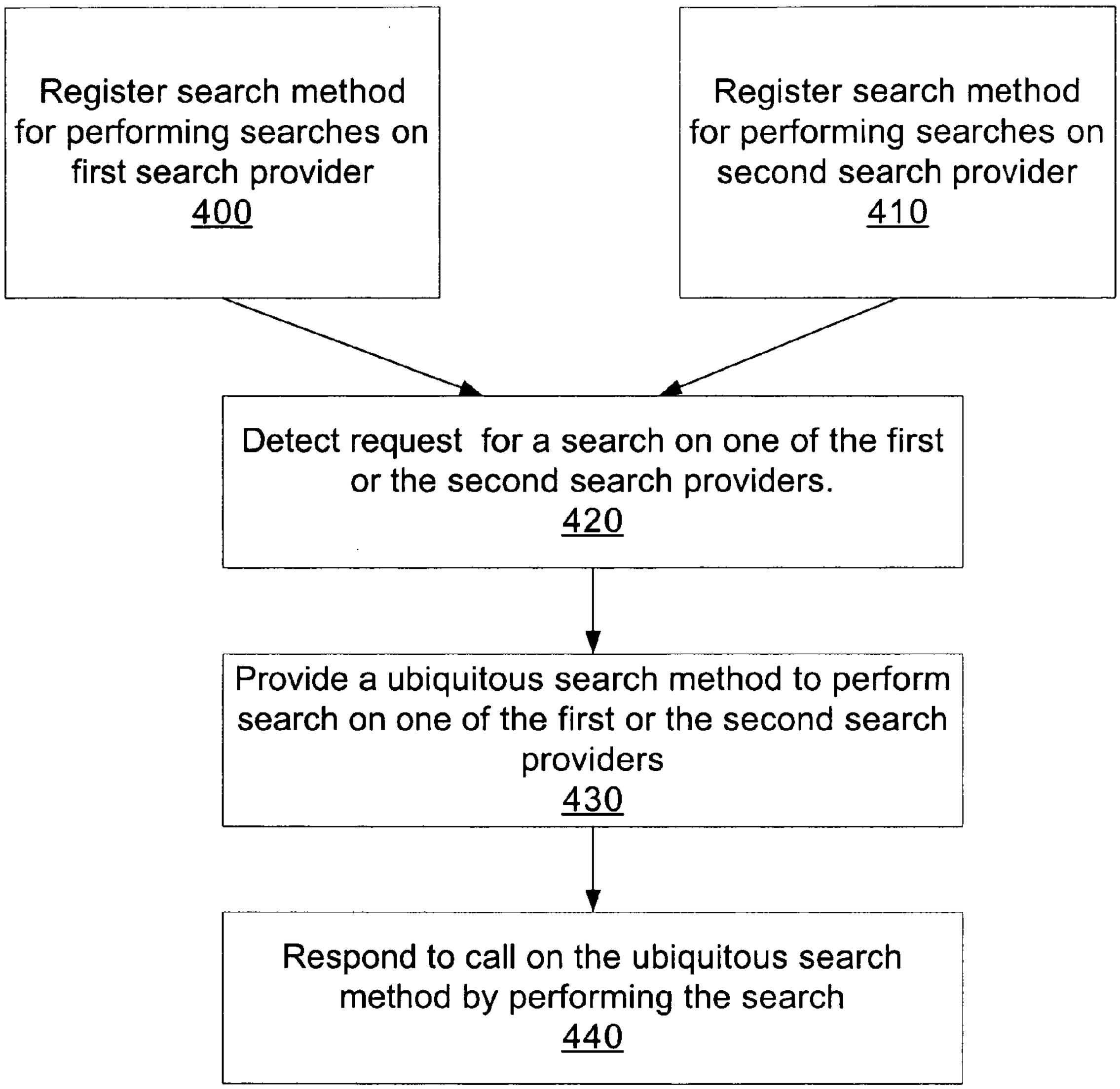
FIG. 4 is a flow chart describing the provision of search functionality according to one embodiment of the invention.

FIG. 4 is a flow chart describing the provision of search functionality according to one embodiment of the invention. In step 400, a search method for performing searches on a first search provider is registered. In step 410, a method for performing searches on a second search provider is registered. Optionally, other methods for other search providers, or alternate methods for either the first or the second search provider may be registered. In step 420, a request is detected for a search on one of the second search providers. In step 430, a search method is provided which will perform a search on the selected search provider (a ubiquitous search). In step 440, when the ubiquitous search method is called, the search is performed on the selected search provider using the registered search method for that provider.

Figure 5:
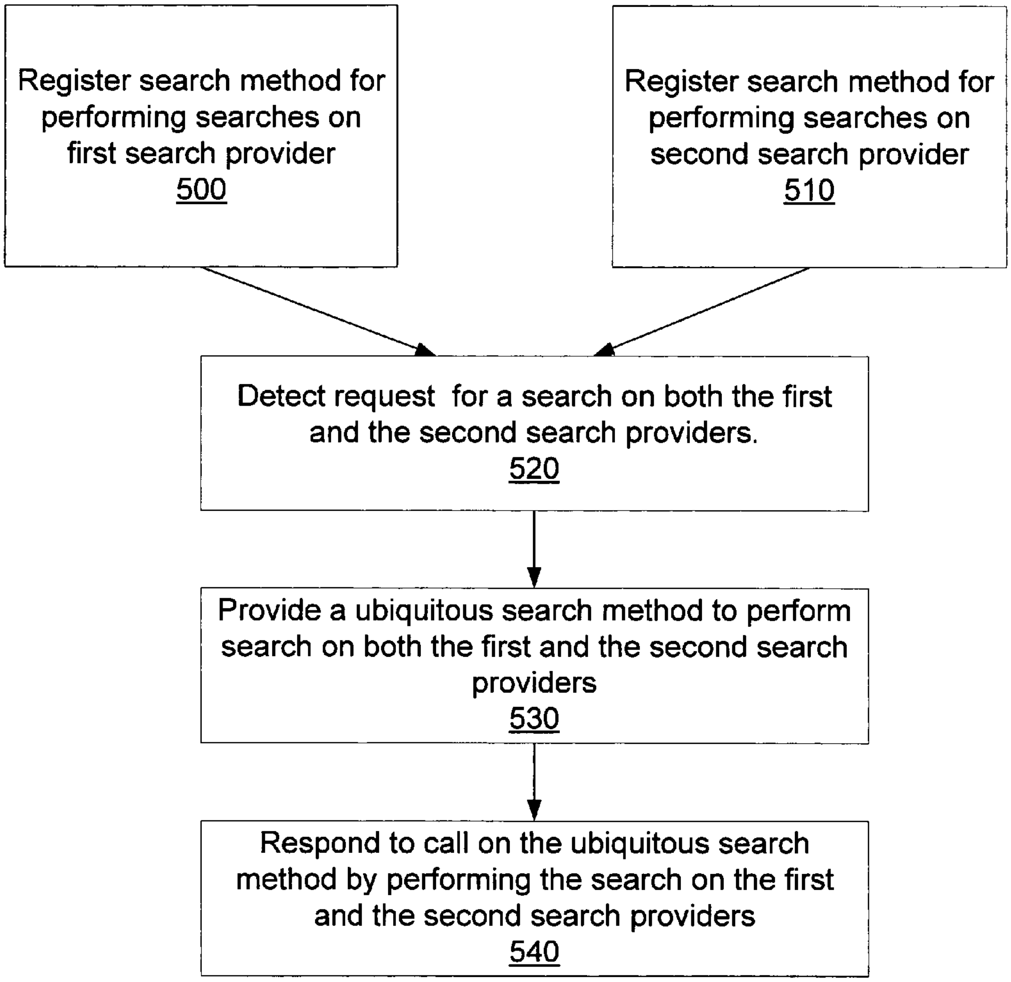
FIG. 5 is a flow chart describing the provision of search functionality according to one embodiment of the invention.

More than one search provider may be searched at a single time. This is more clearly shown in FIG. 5. FIG. 5 is a flow chart describing the provision of search functionality according to another embodiment of the invention. In step 500, a search method for performing searches on a first search provider is registered. In step 510, a method for performing searches on a second search provider is registered. Optionally, other methods for other search providers, or alternate methods for either the first or the second search provider may be registered. In step 520, a request is detected for a search on both the first and the second search providers. In step 530, a search method is provided which will perform a search on both the first and the second search providers (a ubiquitous search). In step 540, when the ubiquitous search method is called, the search is performed on the first and the second search providers using the registered search methods.

Figure 6:
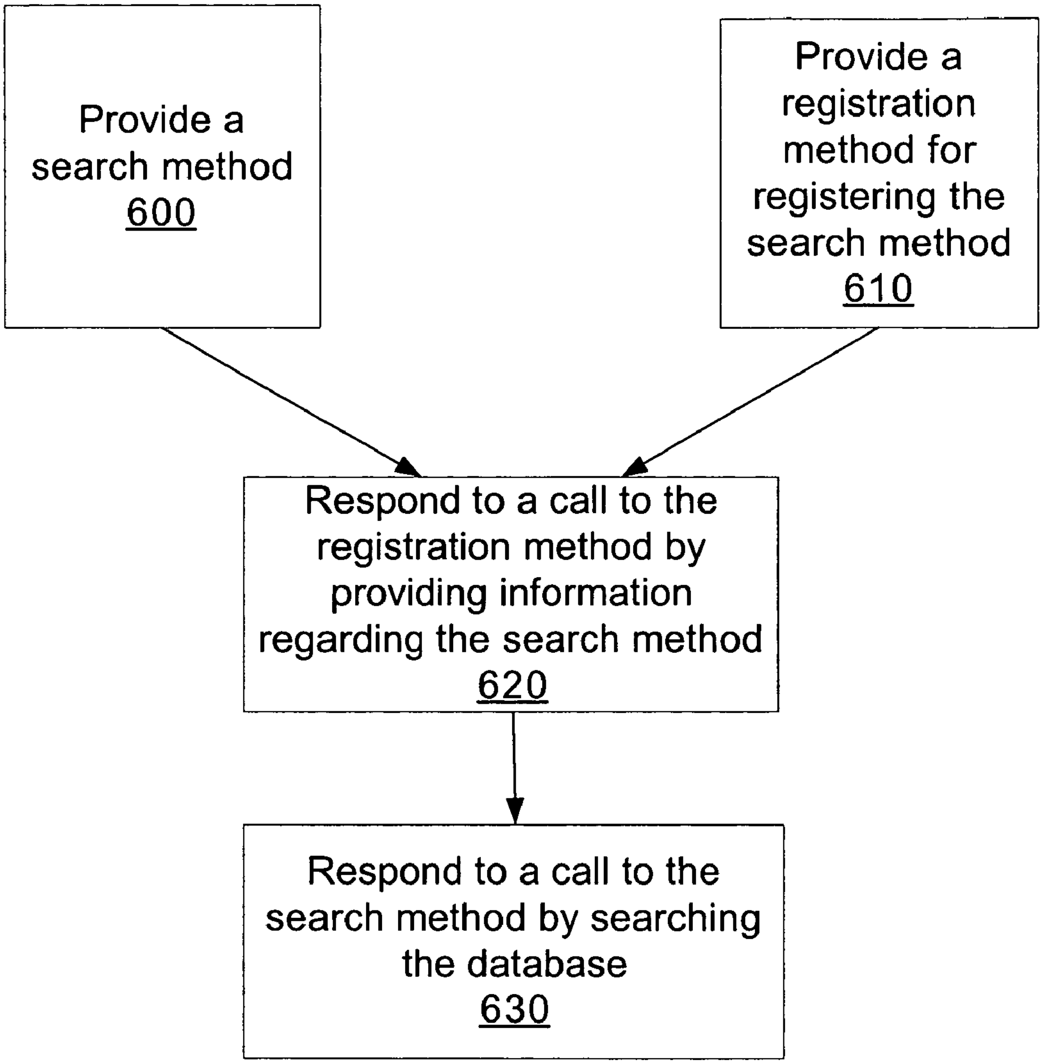
FIG. 6 is a flow chart describing a search provider according to one embodiment of the invention.

FIG. 6 is a flow chart describing a search provider according to one embodiment of the invention. A search method is provided (step 600 ) as is a registration method for registering the search method (step 610. ) In step 620, when the registration method is called, information regarding the search method is provided. In step 630, when the search method is called, the database is searched.

Conclusion

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-implemented method for a search framework to provide search functionality to a web server across at least two search providers, the search framework being interposed between the web server and each of the search providers, said method comprising in the search framework:

registering a first search method for performing searches on a first of said at least two search providers;

registering a second search method for performing searches on a second of said at least two search providers;

registering a first response format for receiving search results from said first search provider;

registering a second response format for receiving search results from said second search provider;

detecting a search request from a client browser to the web server for a search on a selected search provider from among said first search provider and said second search provider, said selected search provider corresponding to a corresponding search method from among said first search method and said second search method;

in response to said detected request, instantiating a search context associated with the search request, the search context exposing a search method corresponding to the selected search provider and selected from among said first search method and said second search method, creating at least one web page and sending the at least one web page to the client browser, the at least one web page comprising a code behind object, the code behind object generating code that calls the method exposed in the search context; and responding to a call from the web server to said methods exposed in said search context by performing said search on the selected search provider utilizing said corresponding search method, receiving a search result from the selected search provider in a response format corresponding to said selected search provider, and providing said received search result to the web server in a ubiquitous format, the ubiquitous format being generic with regard to any of the first and second search providers and the corresponding formats thereof.

2. The method of claim 1, where said method comprises:

reading search provider data regarding said first search provider and said second search provider from a configuration file.

3. The method of claim 2, where said method is implemented in conjunction with a web server, and where said configuration file is a web.config file.

4. A computer-implemented method for a search framework to provide search functionality to a web server across at least two search providers, the search framework being interposed between the web server and each of the search providers, said method comprising in the search framework:

registering a first search method for performing searches on a first of said at least two search providers;

registering a second search method for performing searches on a second of said at least two search providers;

registering a first response format for receiving search results from said first search provider;

registering a second response format for receiving search results from said second search provider;

detecting a search request from a client browser to the web server for a search on said first search provider and said second search provider;

in response to said detected request, instantiating a search context associated with the search request, the search context exposing the first search method and the second search method, creating at least one web page and sending the at least one web page to the client browser, the at least one web page comprising a code behind object, the code behind object generating code that calls the first search method and the second search method exposed in the search context; and responding to a call from the web server to said methods exposed in said search context by performing said search on the first search provider utilizing said first search method and on the second search provider utilizing said second search method, receiving a first search result from the first search provider in said first response format from of said first search provider, receiving a second search result from the second search provider in said second response format of said second search provider, and providing said first and said second search results to the web server in a ubiquitous format, the ubiquitous format being generic with regard to any of the first and second search providers and the corresponding formats thereof.

5. The method of claim 4, where said step of providing said first and said second search results comprises:

returning said first and said second search results in a unified format.

6. The method of claim 5, where said step of detecting a request for a search on said first search provider and said second search provider comprises receiving response format data, and where said step of providing said first and said second search results comprises:

returning said first and said second search results according to said response format data.

7. A computer hardware system including a web server and a search framework to provide search functionality to the web server across at least two search providers, the search framework being interposed between the web server and each of the search providers, said system comprising as the search framework:

registration module for registering a first search method for performing searches on a first of said at least two search providers and for registering a second search method for performing searches on a second of said at least two search providers, and also for registering a first response format for receiving search results from said first search provider and registering a second response format for receiving search results from said second search provider;

search request detection module for detecting a request to the web server for a search on a selected search provider from among on said first search provider and said second search provider, said selected search provider corresponding to a corresponding search method from among said first search method and said second search method;

ubiquitous search method provision module for instantiating a search context associated with the search request, the search context exposing a search method corresponding to the selected search provider from among said first search method and said second search method, creating at least one web page and sending the at lease one web page to the client browser, the at least one web page comprising a code behind object that generates code that calls the methods exposed in the search context; and ubiquitous search method response module for responding to a call from the web server to said methods exposed in said search context by performing said search on the selected search provider utilizing said corresponding search method, receiving a search result from the selected search provider in a response format corresponding to said selected search provider, and providing said received search result to the web server in a ubiquitous format, the ubiquitous format being generic with regard to any of the first and second search providers and the corresponding formats thereof.

8. A computer hardware system including a web server and a search framework to provide search functionality to the web server across at least two search providers, the search framework being interposed between the web server and each of the search providers, said system comprising as the framework:

registration module for registering a first search method for performing searches on a first of said at least two search providers and for registering a second search method for performing searches on a second of said at least two search providers, and also for registering a first response format for receiving search results from said first search provider and registering a second response format for receiving search results from said second search provider;

search request detection module for detecting a search request from a client browser to the web server for a search on said first search provider and said second search provider;

ubiquitous search method provision module for, in response to said detected search request, instantiating a search context associated with the search request, the search context exposing the first search method and the second search method, creating at least one web page and sending the at least one web page to the client browser, the at least one web page comprising a code behind object, the code behind object generating code that calls the first search method and the second search method exposed in the search context; and ubiquitous search method response module for responding to a call from the web server to said methods exposed in said search context by performing said search on the first search provider utilizing said first search method and on the second search provider utilizing said second search method, receiving a first search result from the first search provider in said first response format from of said first search provider, receiving a second search result from the second search provider in said second response format of said second search provider, and providing said first and said second search results to the web server in a ubiquitous format, the ubiquitous format being generic with regard to any of the first and second search providers and the corresponding formats thereof.

9. The system of claim 8, where said first and said second search results are provided in a unified format.

10. The system of claim 9, where said search request detection module receives response format data, and where said first and said second search results are provided according to said response format data.

* * * * *